United States Patent [19]

Ernster

[11] Patent Number: 4,973,488

[45] Date of Patent: Nov. 27, 1990

[54] HYDROLYZED PROTEINACEOUS MILK SOLID AND PROCESS OF MAKING

[75] Inventor: Michael F. Ernster, Palos Verdes Estates, Calif.

[73] Assignee: Excelpro, Inc., Los Angeles, Calif.

[21] Appl. No.: 353,091

[22] Filed: May 17, 1989

[51] Int. Cl.[5] .......................... A23J 1/20; A23C 21/06

[52] U.S. Cl. .................................... 426/580; 426/583; 426/522; 426/657

[58] Field of Search ................ 426/580, 583, 522, 657

[56] References Cited

U.S. PATENT DOCUMENTS 2,832,685 4/1958 Scott .................................. 426/580

4,545,933 10/1985 Ernster ............................... 426/643

*Primary Examiner*—Donald E. Czaja

*Assistant Examiner*—Helen Pratt

*Attorney, Agent, or Firm*—Herb Boswell

[57] ABSTRACT

A hydrolyzed proteinaceous milk solid is prepared from a heat treated skim milk liquor which contains denatured whey proteins as well as casein proteins. The solid is prepared by rapidly heating the skim milk liquor to a temperature above 170° F. and adding acid to the heated skim milk liquor to adjust the pH of the liquor to a pH of about 4.7. The heated pH adjusted liquor is aged for a time period during which coagulation and agglomeration of whey and casein proteins, carbohydrates and ash takes place forming a plurality of coagulum suspended in the remaining whey liquid. The coagula is separated from the whey liquid, cooled, dewatered and dried. The resulting dry solid is treated with a caustic agent as, for instance, sodium hydroxide, in a solid phase reaction to yield the hydrolyzed proteinaceous milk solid.

25 Claims, 3 Drawing Sheets

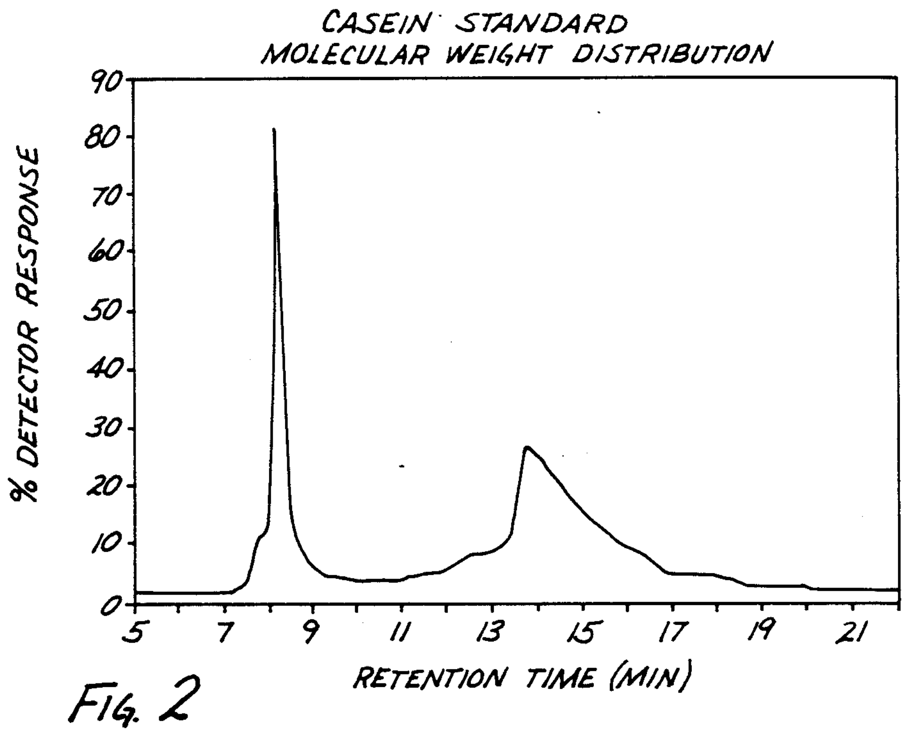
FIG. 2
FIG. 3
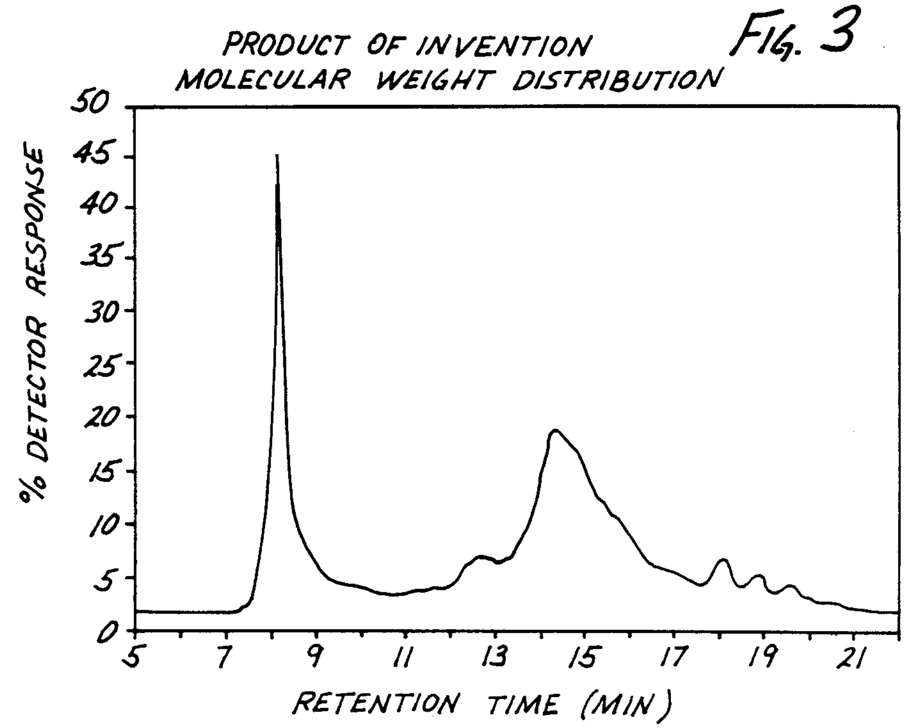

HYDROLYZED CASEIN OF U.S. 4,545,933

ACID HYDROLYZED CASEIN STANDARD

HYDROLYZED PROTEINACEOUS MILK SOLID AND PROCESS OF MAKING

BACKGROUND OF INVENTION

This invention is directed to a hydrolyzed proteinaceous milk solid which contains both whey and casein proteins.

Milk is a unique food stuff in that it contains proteins, lipids and carbohydrates along with trace amounts of certain inorganic elements including calcium, magnesium, potassium, sodium and phosphorus. Further, it also contains certain vitamins. The production of milk for the new born is a specific mammalian adaptation with the milk of any particular species normally fully meeting all of the nutritional requirements of the infants of that species.

Man has utilized the milk of certain domesticated animals not only for the milk itself, but also for the production of cheese, butter and other milk products. While the general composition of milk is essentially the same in all mammalian species, the concentration of certain constituents of the milk vary among the species.

Bovine milk contains about 3 to 4% protein. The casein component of the bovine milk protein constitutes about 80% of the total protein. The remaining protein is divided among certain whey proteins with the principal one being $\beta$-lactoglobulin.

It was recognized in antiquity that the casein protein of bovine milk could be separated from the "whey" fractions by in situ acidification of milk utilizing enzyme extracts or by the direct addition of acid to the milk. For the preparation of casein from milk, after skimming the cream off the top the milk is acidified either by the addition of acid or by an enzyme. Below about pH 4.7 the casein precipitates as "curd" leaving a clear liquid, the "whey".

The harvesting of casein from milk utilizing either acid or an enzyme precipitation while efficient for recovering the casein protein from the milk, does not recover any whey protein. After acid enzyme precipitation of casein from milk, normally the whey fraction is discarded. This thus constitutes a waste of up to 20% of the protein content of the milk. It has been suggested as, for instance, Phillips, et al. U.S. Pat. No. 4,218,490, to harvest the whey protein content of milk utilizing ion exchange resins. Additionally, whey proteins have been isolated utilizing micropore filters having a pore size fine enough to retain the whey protein particles. While both of these processes are certainly utilitarian, they both require special apparatus, i.e. either ion exchange resins or micropore filters, and thus can not be broadly practiced.

In U.S. Pat. No. 4,545,933 entitled Hydrolyzed Protein Composition and Process Utilized in Preparation Thereof, assigned to the same assignee as this application, the inventor, John H. Ernster describes a process for hydrolyzing casein protein utilizing caustic solutions of sodium or potassium hydroxide. The hydrolyzed protein produced by the process of this patent has certain unique properties which are useful in the preparation of certain processed food products. The starting materials suggested for the process of U.S. Pat. No. 4,545,933 is acid precipitated casein, that is casein which contains no whey protein.

It has increasingly been recognized that over indulgence of certain animal fat is deleterious to the health of man. Unfortunately the fats or lipid content of certain food stuffs contribute to the palatability of the food product. Some of the richness and taste characteristics of many dessert items result from their lipid or fat content. More often than not, if the fat or lipid ingredients are excluded from a recipe the final product simply does not retain the characteristics of the original product and thus is unacceptable to the consumer.

BRIEF SUMMARY OF THE INVENTION

The present invention is directed to a hydrolyzed proteinaceous solid derived from milk which is low in fat content, i.e. essentially zero fat content, but still retains certain desirable organoleptic properties as for instance richness, smooth texture and body. These hydrolyzed proteinaceous milk solids are formed by rapidly reheating a previously heat treated skim milk liquor which contains denatured whey proteins or by direct utilization of such a hot skim milk liquor and acidifying the skim milk liquor above a temperature of 170° to a pH between 3.9 and 5. After acidification the skim milk liquor is held for a time period of about one minute to about ten minutes to coagulate and agglomerate both whey and casein proteins, carbohydrates and ash in the skim milk liquor into multiple coagulum, i.e. a coagula, which is suspended in a whey liquid. The coagula is separated from the whey liquid and is cooled, dewatered and dried to a solid. The solid is then heat treated in the manner of U.S. Pat. No. 4,545,933 with a caustic agent in a solid phase reaction yielding the hydrolyzed proteinaceous milk solids of the invention.

The initial skim milk liquor can be prepared by heat treatment of skim milk, heat treatment of rediluted concentrated skim milk or heat treatment of skim milk solids suspended in water. These products are heat treated at a temperature of from about 170° to 200°, preferably 190° for about 20 minutes to 35 minutes to denature whey proteins contained therein. If the heat treated milk products are not to be immediately process utilizing the above referred to acidification and aging steps, they are cooled to prevent further heat degradation and then rapidly reheated to at least 170° just prior to acidification.

Alternatively "high heat" nonfat dry milk solids which have been previously heat treated to denature whey proteins therein can be suspended in water to form a skim milk liquor having denatured whey proteins therein. Such "high heat" nonfat milk solids in water are the process as described above by being rapidly heated to at least 170° prior to acidification.

After the coagula has formed and has been separated from the whey liquid, the coagula is rapidly cooled as, for instance, utilizing a rapid cooling technique by spraying with cooling water prior to dewatering and drying. When a water spray or a water bath is utilized for cooling of the coagula, an amount of cooling water no greater than twice the weight of the coagula is utilized in order to prevent undue solubilizing of the whey protein in the coagula.

Prior to acidification of the skim milk liquid the solid contents therein will range from about 9 to about 25% solids and preferably from about 15 to about 20% by weight of solids.

Acidification is preferably conducted utilizing dilute acid as, for instance, dilute sulfuric acid.

BRIEF DESCRIPTION OF THE DRAWINGS

This invention will be better understood when taken in conjunction with the drawings wherein:

FIGS. 2 through 5 are diagrams showing molecular weight distributions of hydrolyzed proteinaceous milk solids of the invention and other standards.

Figure 1:
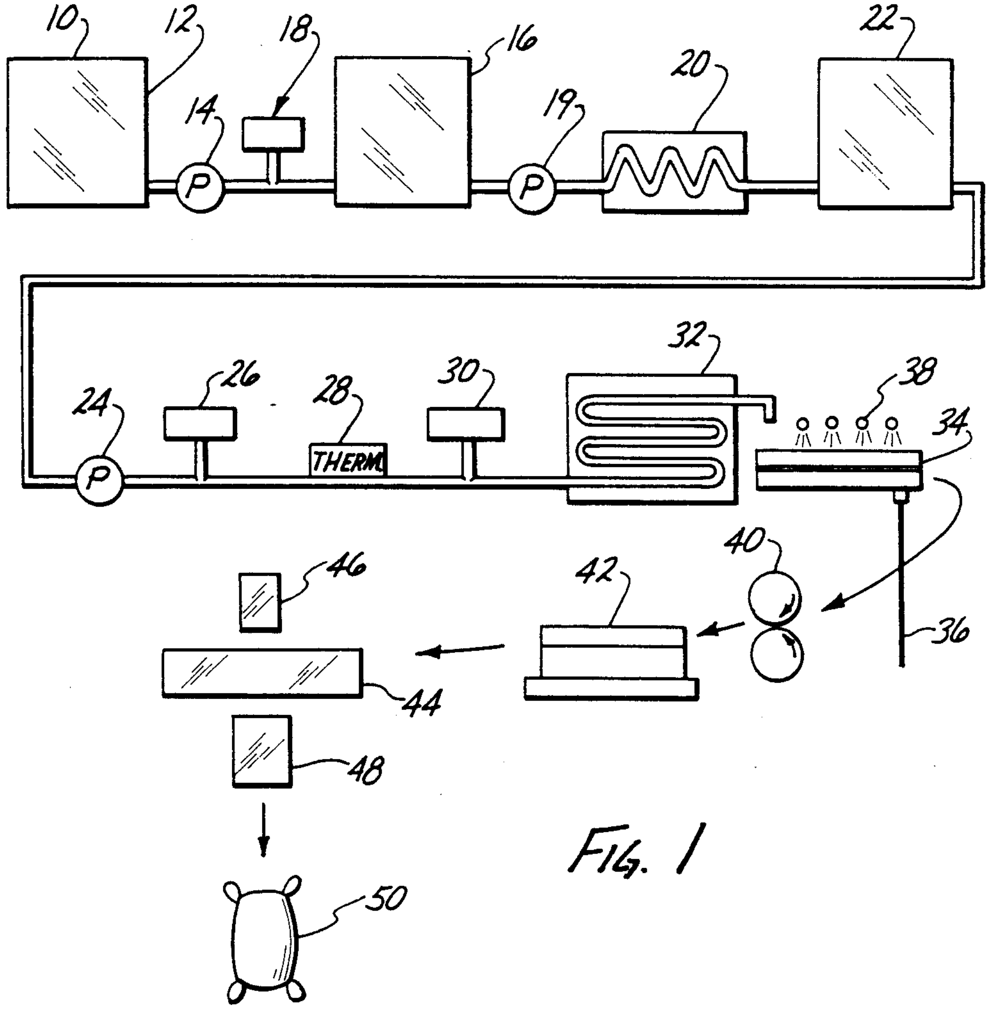
FIG. 1 is a schematic of a process for preparing hydrolyzed proteinaceous milk solids of the invention.

This invention utilizes certain principles and/or concepts as are set forth in the claims appended hereto. Those skilled in the food processing arts will realize that these principles and/or concepts are capable of being utilized in a variety of embodiments which may differ from the embodiments utilized for illustrative purposes herein. For this reason this invention is not to be construed as being limited solely to the illustrative embodiments, but should only be construed in view of the claims.

DETAILED DESCRIPTION OF THE INVENTION

For the purposes of this invention unless otherwise indicated, all composition ingredient percentages are expressed as weight percentage of the individual ingredient compared to the total composition. Utilizing such a weight percentage designation, bovine milk typically contains 87% water and 13% total solids. The solids generally include four major groups, protein from about 3.0 to about 4% weight percent, lipid from about 3.5 to about 5.0% weight percent, sugar from about 4.5 to about 5.0% weight percent and ash at about 0.75% weight percent. Other minor constituents include certain vitamins and compounds such as carotene and xanthophyll. The pH of fresh milk is nearly neutral in a range of about 6.6 to 6.8, however unsterilized milk rapidly becomes acidic because of fermentation by micro organisms.

The ash portion of milk, i.e the ingoranic solids, normally includes calcium, magnesium, phosphorus, sodium, potassium and chlorine as major components with trace amounts of other inorganic elements. From a dietary standpoint the only nutritional deficiency in milk is low iron and copper.

The lipids in milk are dispersed as very small globules which have a lower density than the aqueous portion of the milk. Certain of the lipids, i.e. the cream can be removed from milk just upon standing and the major amount of the remaining portion can be removed by centrifugation yielding skim milk.

With the removal of the lipid or fats from the skim milk the solids remaining therein are composed of the protein, sugar and ash. Lactose constitutes the principal carbohydrate of milk. If unsterilized milk is allowed to stand fermentation of the lactose yields lactic acid. The addition of rennet extract, i.e. an enzyme from calves stomachs, to milk results in in situ lactic acid production. Acidification either by external acid or by the generation of lactic acid via an enzyme results in precipitation of only one of the milk proteins—this being casein.

Acid precipitation of the major protein constituent of milk, i.e. casein, is easily effected by acidification to pH 4.7. At pH 4.7 calcium paracasein which exists in the milk as a colloid suspension precipitates out as casein. Left behind in the remaining milk fluid are the whey proteins. Because the acid form of casein is highly insoluble, casein is generally converted to sodium caseinate or other similar caseinate prior to utilization of the same in processed foods.

The major whey protein of milk, β-lactoglobulin, like casein is composed of all of the common amino acids. Further, both casein and β-lactoglobulin are very rich in essential amino acids. Casein has a relative low content of sulfur, however this is balanced by the high sulfur content of β-lactoglobulin. Processes which only harvest the casein protein portion of milk thus wastes the valuable protein content of the whey proteins.

Whey protein in milk can be denatured by heating the milk. A product referred to "high heat" nonfat dry milk solids is formed by heating skim milk followed by evaporation to yield the "high heat" nonfat dry milk solids. If these so-called "high heat" milk solids are dissolved in water and acidified in the manner normally utilized to produce acid precipitated casein, a very fine granular curd forms which is essentially impossible to separate from the whey liquid and/or to dry. This fine granular curd can be described as a non dispersible solid which is extremely "slimy" and difficult to handle and process.

In U.S. Pat. No. 4,545,933 entitled Hydrolyzed Protein Composition and Process Used in Preparation Thereof by John H. Ernster, the entire contents of which are herein incorporated by reference, a process is described for treating acid precipitated casein with caustic agents to form a hydrolyzed casein product. The process of U.S. Pat. No. 4,545,933 is utilized in conjunction with further processes of this invention for the preparation of hydrolyzed proteinaceous milk solids which have desirable properties. These desirable properties include high dispersibility. This results in production of a paste like consistency at low total solids when the milk solids of the invention are mixed with water. The products rapidly disperse in water at low total solids to yield a smooth grit free texture which has body and richness.

Since the hydrolyzed proteinaceous milk solids of the invention are produced from skim milk, i.e. milk having the fat removed, the resulting hydrolyzed proteinaceous milk solids of the invention are essentially devoid of fat. Thus, the richness, texture and body building characteristics of the milk solids of the invention are achieved in the absence of fat and when the milk solids of the invention are utilized as recipe components of other food stuffs, they result in a reduced fat content of the food stuff without sacrificing traditional richness, body and texture of the food stuff.

When mixed in water at a 14% solids level, the hydrolyzed proteinaceous milk solids of the invention yield a viscous non gel forming product which is smooth at room temperature and thins out in a manner similar to syrup at higher temperatures. When chilled the product becomes brittle and waxy and does not freeze hard at 34° F. Thus, the hydrolyzed proteinaceous milk solids of the invention is particularly suitable for use in certain products as, for instance, custards and pudding and the like which rely on the above type properties for their character and distinctiveness. This however is achieved without the high fat content normally found in these products.

If whey protein is isolated as, for instance, utilizing the above described ion exchange or micropore filter processes, and then heated in water it will form a gel, however this gel is a very hard gel which is subject to shear. This is in contrast the hydrolyzed proteinaceous milk solids of the invention which contain both hydrolyzed whey and casein proteins. The hydrolyzed proteinaceous milk solids of the invention are more elastic and will flow as opposed to shearing. This is also opposed to a casein water mixture. Casein by itself in water is only slightly viscous and is non gel forming.

Fully skimmed milk or the above referred to "high heat" nonfat dry milk solids are utilized as the starting material of the invention. Preferably, the skim milk contains less than 2% fat on a dry solids basis. As indicated above bovine milk contains from 3.5 to 5.0% lipid. Since only 13% of the bovine milk is total solids, the 3.5% total lipid of bovine milk accounts for approximately 27 to 38% of the dry solids. Utilizing skim milk having less than 2% fat on dry solids basis results in the low to no fat content of the hydrolyzed proteinaceous milk solids of the invention.

Fully skim milk typically is available in several forms. In one form the skim milk has the same water content as raw milk. Since the 3.5 to 5% fat content of the raw milk has been reduced, this form of skim milk generally has about 9% solids content.

Where abundantly available, fully skim milk is often times dried to a powder. Because of the reduction in volume and weight, and the convenience of handling a solid versus a liquid, dry skim milk powder is often the form of choice for the distribution of skim milk.

Alternately skim milk is condensed reducing the water content while still maintaining a liquid material. Such condensed skim milk can be rediluted with water to achieve a dilution of choice of the solids in the liquid component.

For use in the invention a skim milk formed from either neat skim milk, rediluted concentrated skim milk or powdered skim milk which is suspended in water is formed at a solids concentration of from about 9 to about 25% solids. Preferably, however, the solids concentration is adjusted to from about 15% to about 20% solids.

If neat skim milk is utilized at about a 9% solids concentration, concentrating of the neat skim milk may be effected to the 15 to 20% by weight solids content. If condensed skim milk is utilized, it is rediluted to the 15 to 20% by weight solids concentration and if dry skim milk solids are utilized, they are diluted in sufficient water to achieve a 15 to 20% by weight solids concentration.

Irrespective of the source of the skim milk, it is then heated to a temperature of from about 170° to about 200° F. (just below boiling) for a time period of from about 20 minutes to about 35 minutes preferably for about 30 minutes to denature the whey proteins in the skim milk. For reasons related to a continuous processing scheme as outlined below, upon completion of the denaturation of the whey proteins, the skim milk is then cooled and held at room temperature. Prolonged heating of the skim milk is counter indicated in that it leads to heat induced chemical changes of the milk.

For the purposes of this specification and the claims attached hereto, after heating to denature the whey proteins the skim milk can be considered as a skim milk liquor containing denatured whey proteins and having a solids content in a concentration range by weight of about 9 to about 25% solids or preferably from about 15 to about 20% solids.

Alternatively to preparing the above skim milk liquor having the denatured whey protein therein, "high heat" nonfat dry milk solids can be utilized. These milk solids are produced by dehydrating skim milk which has been heat treated as outlined above to denature the whey proteins therein. These "high heat" nonfat skim milk solids, however, are more expensive to produce and are not always as available in the market place as are skim milk or skim milk solids. For this reason generally skim milk, rediluted concentrated skim milk or skim milk solids will be utilized in the process of the invention.

If neat skim milk, rediluted concentrated skim milk or skim milk solids in water are utilized, these are heat treated at 170° to 200° for 20 to 35 minutes to form a skim milk liquor which is then further processed. If "high heat" nonfat dry milk solids are utilized they are stirred in water at a concentration of from 15 to 20% by weight to form the skim milk liquor.

Referring to FIG. 1, a volume of skim milk is stored in a skim milk storage tank 10. The skim milk storage tank 10 is generally a large tank, as for instance, a 3000 gallon tank, and the skim milk 12 located therein is at a solids concentration of about 15% by weight solids in liquid. Aliquots of the skim milk stored in the storage tank 10 are pumped via pump 14 toward a holding tank 16.

Live steam is added to the skim milk liquid at steam injector 18 at about 240° F. at about 49 psi to raise the temperature of the skim milk to about 190° F. The hot skim milk is held within the holding tank 16 at about 190° F. temperature for a thirty minute time period. At the conclusion of this time period the liquid from the holding tank 16 is pumped via pump 19 through cooling coils 20 to a treated skim milk storage tank 22.

The storage tank 22 serves as a supply reservoir for a continuous process downstream from the storage tank 22 by continuously supplying the skim milk liquor to a positive displacement pump 24. The process upstream from the holding tank 22, however, the heating process in tank 16 and the cooling process in coils 20 can be considered a batch-wise process.

Alternatively to utilizing the cooling coil 20 and storing batch treated skim milk liquor in the holding tank 22, the heating process within the holding tank 16 can be conducted continuously and at a feed rate such that the skim milk is heated for a time period of 20 to 35 minutes and immediately thereafter fed to the positive displacement pump 24.

Such a continuous heat treatment could utilize an elongated heating tube (not separately numbered or shown) of a length and volume such that the skim milk would be contained within the heating tube for a time period between 20 to 35 minutes and at the end of this time period would be discharged directly to the positive displacement pump 24. For simplicity of operation, however, use of a batch-wise heating coupled with the use of the cooling coil 20 and the storage tank 22 is effected.

The positive displacement pump 24 is chosen to feed the skim milk liquor at a particular feed rate, as for instance, 750 gallons per hour. Downstream from the positive displacement pump 24 is a second steam injector 26. A temperature controller 28 is utilized in conjunction with the steam injector 26 to insure that the skim milk liquor displaced from the pump 24 is injected with sufficient steam by the steam injector 26 to raise its temperature to at least 170° preferably between 190° and 200° F.

Downstream from the steam injector 26 is an acid injector 30. An acid solution is injected into the heated skim milk liquor at a rate sufficient to reduce the pH of the skim milk liquor to a level between 3.9 and 5.0 preferably at pH 4.7.

A physiologically compatible acid, as for instance, sulfuric or hydrochloric acid is utilized for pH reduction. Other suitable acids might include lactic or citric acid, however, for the reasons of economy and handling, inorganic sulfuric or hydrochloric acid is preferred over the organic acids and for reasons of product characteristics, sulfuric acid is preferred.

The acid, as for instance sulfuric acid, is injected as a diluted acid, as for instance in a dilution of at least 1 to 10 acid to water or preferably 1 to 20 acid to water. For a 750 gallons per minute flow rate, at a 15% solid content, 1 to 20 diluted sulfuric acid is added at approximately 12 gallons per hour at the acid injector 30.

Downstream from the acid injector 30 is a holding tube 32 of a length calculated to contain the flowing stream of the heated acid adjusted skim milk liquor for a time period of from 1 to 10 minutes. Typically the holding tube 32 would be of a length sufficient such that the acid adjusted heated skim milk liquor is held within the holding tube for about 2 minutes.

Within the holding tube 32 the heated acid adjusted skim milk liquor is aged. During the aging process whey and casein proteins, carbohydrates and ash within the skim milk liquor coagulate and agglomerate together to form "kernel" like coagulum masses of various size of from about ¼ inch to about 2½ inches in diameter. The serum portion, i.e. the whey liquid surrounding the kernels or aggregate kernels, is clear, transparent and usually of a greenish cast.

The totality of the coagulum kernels can be considered as constituting a coagula suspended in the whey liquid. A static or an active agitator can be incorporated within the holding tube 32 to assist in coagulation and agglomeration of the whey and casein proteins, the carbohydrates and the ash into the coagula.

Once formed the kernels or aggregates of kernels or curd constituting the coagula is expeditiously separate from the whey liquid. This can be done, as for instance on a continuous moving screen 34. Discharge from the holding tube 32 is directed toward the screen 34. The mesh size of the screen 34 is sufficient to retain the coagulum thereon allowing the whey liquid to descend through the screen 34 to whey disposal tube 36.

Alternatively to use of a moving screen 34, other separation apparatus can be utilized, as for instance static screens, decanter type centrifuges, or inclined, flighted or Archimedian screw conveyers. Irrespective of the type of separator used, the coagulum is separated from the whey liquid and at this point the process changes from a liquid handling process to a solid handling process.

Water sprayers 38 are utilized to cool the coagulum on the moving screen 34. As the coagulum is drained of the whey liquid on the moving screen 34, it is simultaneously sprayed with a cool water shower to halt further chemical changes and to reverse the agglomeration process. Additionally, the cooling water also washes away certain amounts of lactose, and acid and milk salts from the coagula.

As formed the kernels or agglomeration of kernels constituting the coagula are firm and rubbery. While I do not wish to be bound by theory it is believed that within the coagula the denatured whey proteins from the skim milk liquid are held within walls of precipitated elastic adhesive casein protein.

In order to retain and maintain a high percentage of whey protein in the coagula it is important not to disturb the structure of the coagula, i.e. the kernels or agglomeration of the kernels, nor to subject them to excess water sprays. If the coagula is subject to high levels of water or mechanical destruction loss of the denatured whey proteins starts to occur. This is both economically and functionally disadvantageous since the whey proteins constitute an important nutritional addition to the milk solids of the invention and additionally contribute toward the desirable functional properties of these milk solids.

It has been found that an amount of cooling wash water not, exceeding two times the weight of the coagula serves to cool and wash the coagula without excessively breaking down the coagula such that valuable whey protein is lost to the whey disposal tube 36.

A cooling water wash is the presently preferred method of simultaneously both cooling and washing the coagula. Other cooling and washing might also be practiced taking in to consideration the above teachings regarding limiting the amount of wash water and mechanical handling. Such other cooling and washing might include refrigeration, ice water baths and the like.

Draining on the screen 34 of both the whey liquid and the wash liquid from the sprayers 38 is effected for a time period to reduce the water level of the coagula below about 55% moisture level. After reduction of the moisture level below about 55%, the coagula can then be mechanically handled to reduce the size of the particles without loss of the whey protein.

After draining on the screen 34 to a moisture level below 55% the coagula is then mechanical dewatered in a press 40. Alternatively to the press 40 decanting centrifuges or vibrating screens can be used for dewatering purposes.

From press 40 the dewatered coagula solid is then dried in dryer 42 and pulverized to a fine powder. Suitable for the dryer 42 are static kilns, rotary kilns, fluid bed dryers, ring dryers or attrition dryers.

The pulverized, dried coagulum solid from the dryer 42 is then processed as per the procedure of the above referred to U.S. Pat. No. 4,545,933 to John Ernster. Utilizing the process of that patent, the dried coagulum solid is treated with a caustic agent. Suitable for the caustic agent are sodium hydroxide, potassium hydroxide, magnesium hydroxide and ammonium hydroxide. For ease of handling and for economic considerations, normally caustic soda, i.e. sodium hydroxide is utilized.

While it is conceivable that the wet coagula from the screen 34 could be directly hydrolyzed, hydrolysis prior to drying yields very small hollow particles which are then later very difficult to rehydrate when these particles are utilized to prepare food stuffs or the like. For this reason it is preferred that prior to hydrolysis the product is dewatered and dried.

The powdered coagulum solid from the dryer 42 is a fine white, practically insoluble powder having a pH of about 5.0. This product is loaded into a ribbon blender 44 and treated with a caustic agent in a solid phase reaction. For ease of addition of the caustic agent it can be added as an aqueous solution as, for instance, a 50% solution of the caustic agent in water. Alternately, however, as per the teachings of U.S. Pat. No. 4,545,933, the caustic agent can be added as a dry powder and any necessary water added to the mixture of the caustic agent and the dried pulverized coagula solid.

The amount of water used for the hydrolysis reaction normally will range between 10 to 20 percent by weight of the total weight of the caustic agent plus the weight of the coagulum solid. Since this amount of water is insufficient to solubilize the coagulum solid a solid phase reaction takes place between the coagulum solid and the caustic. In calculating the total water utilized for the hydrolysis, any residual water remaining in the coagulum solid is included in the total amount of water.

If the caustic is added in solution it will be solubilized in the total aliquot of water or a portion thereof with the remainder added directly to the blender. If the caustic is added as a dry ingredient to the blender then the aliquot of water will be added directly to the blender ingredients taking into account any residual water in the coagulum solid. It is presently preferred to added the caustic agent in solution in at least part of the water utilized for the hydrolysis reaction.

Typically 1000 pounds of the powdered coagula solid would be added to a ribbon blender 44 and 80 to 100 pounds of 50% caustic soda from dispenser 46 added to the ribbon blender. The contents of the ribbon blender are then stirred from about 10 to about 30 minutes. During this stirring a notable phase reversion is apparent during which time the powder is physically altered in appearance in an exothermic reaction.

Because of the exothermic hydrolysis reaction, after completion of the hydrolysis reaction, the resulting hydrolyzed proteinaceous milk solid product of the invention is cooled in a cooler 48 and packaged in bags 50.

Upon dispensing the product from the blender 44, it has a high pH typically at about 9.5, however, during subsequent storage of the product in the bags 50, this will decline to a pH of about 8.0. While I do not wish to be bound by theory, as is stated in U.S. Pat. No. 4,545,933, during the hydrolysis reaction, in the blender 44 an ammonicidal odor is detected. Loss of volatile ammonia might account for the drop of the pH of the product upon storage.

EXAMPLE I 3,000 gallons of skim milk adjusted to a solids concentration of 15% solids was injected with steam at 240° F. under 40 psi pressure and held for 30 minutes in a jacketed heating tank. After completion of the treatment the liquid was pumped through a cooling coil and fed to a storage reservoir. Liquid was pumped from the storage reservoir at a rate of about 750 gallons per hour and again injected with steam to a temperature of 190° F. 1 to 20 diluted sulfuric acid in water was added at a rate of 12 gallons per hour and the heated acidified liquor was passed to a jacketed holding tube. Within the jacketed holding tube coagulum kernels were formed. After expiration of a two minute period in the holding tube the contents were ejected onto a rotating screen and sprayed with cold water. The sprayed particles were dewatered in a mechanical press and dried in a static kiln drier. 1,000 pounds of the dried material was loaded in a ribbon blender and 100 pounds of a 50% sodium hydroxide solution added. The contents of the blender were stirred for ½ hour. During stirring a solid phase was continuously maintained, however, the contents of the blender changed in physical appearance and liberated heat. After stirring for ½ hour the contents were cooled and packaged in 100 pound packages. Analysis of this product indicated a moisture content of 9.01%, total protein content of 75.92%, calcium 850 mg/100 gm, potassium 1,699 mg/100 gm, sodium 1,261 mg/100 gm, fat (acid hydrolysis) 0.88%, ash 6.20% and carbohydrate 7.99%.

EXAMPLE II

In a manner similar to Example I, condensed skim milk was rediluted with water from a 44% solids level to a 20% solids level by weight and treated in a manner as per Example I.

EXAMPLE III

In a like manner to Example I, dry skim milk solids were diluted in water to a level of 15% solids and treated as per Example I.

EXAMPLE IV

"High heat"-0 dry nonfat milk solids obtained from San Joaquin Valley Dairymen, Los Banos, Calif. or Challenge Dairy Products, Dublin, Calif. were mixed with water to a solids level of 15%. The resulting solution was rapidly heated to 190° by the injection of live steam and acidified and further treated as per Example I.

The hydrolyzed proteinaceous milk solid product of the invention as produced by the above described process has from about 60 to about 95% protein, from about 1 to about 10% carbohydrate and from about 1 to about 12% ash. The fat content is essentially nill and the pH of the product ranges from about 5.1 to about 11.0 with a decrease of pH upon storage to a level from about 5.0 to about 8.0.

When analyzed utilizing size exclusion chromatography (SEC) high performance liquid chromatography (HPLC) the hydrolyzed proteinaceous milk solid product of the invention shows marked differences from standardized samples of casein, acid hydrolyzed casein or the hydrolyzed casein protein product of U.S. Pat. No. 4,545,933.

Samples of casein (obtained from Sigma Chemical Company, St. Lewis, Mo.), hydrolyzed casein corresponding to the product of U.S. Pat. No. 4,545,933 (obtained from Excelpro Inc., Los Angeles, Calif.), acid hydrolyzed casein and the hydrolyzed proteinaceous milk solid of the invention were compared utilizing size exclusion chromatography to separate individual components within these products according to size. Utilizing size exclusion chromatography the larger molecular fractions from a sample are first eluted followed by progressively smaller molecules. This can be plotted and compared to standard samples for the determination of molecular weight ranges of products.

Various molecular weight distribution numbers can be obtained utilizing statistical analysis of SEC chromatographic data. These numbers provide information relative to sample characteristics. Suitable statistical analysis provides a polydispersity quantitative measurement which measures the breadth of a molecular weight distribution (a value of 1 is obtained for a completely mono dispersed sample). Further, a number average molecular weight (Mn) is obtained as an index of smaller molecules and their distribution, a weighted average molecular weight (Mw) is an index of slightly larger molecules and a Z average molecular weight (Mz) refers to the very high molecular weight components in the distribution. A high performance liquid chromatograph is utilized in order to provide high pressure and precise flow rates required for the SEC separation. Data is collected via computerized data collection associated with the HPLC chromatograph. SEC high performance liquid chromatography analysis is commercially available from Biotech Analyses, Lakewood Colo.

Table 1 shows SEC HPLC data of a casein standard. Table 2 shows similar data for a hydrolyzed proteinaceous milk solid of the invention. Table 3 shows similar data for a hydrolyzed casein protein as produced via the teachings of U.S. Pat. No. 4,545,933 and Table 4 shows similar data for an acid hydrolyzed casein standard.

TABLE I

SEC HPLC CHROMATOGRAPHY OF CASEIN STANDARD

Method: SEC1
Conditions: TSK G3000SW column, 60 × 0.75 cm, A 280 nm. Mobile phase: 0.1M $KH_2PO_4$, 0.1M $Na_2SO_4$, 5% MeOH, pH 6.8.

MOLECULAR WEIGHT DISTRIBUTION REPORT

| PEAK # | % AREA | PEAK M.W. | NUMBER AVE | WEIGHT AVE | Z AVE | POLYDISPERSITY |
|---|---|---|---|---|---|---|
| 1 | 2.08 | 710435 | 602173 | 613512 | 622897 | 1.019 |
| 2 | 31.43 | 642240 | 593580 | 603669 | 611673 | 1.017 |
| 3 | 66.49 | 60413 | 375 | 57708 | 131022 | 154.1 |
| Total | 100.00 | | 643 | 289819 | 565858 | 450.9 |

ESTIMATED % HYDROLYSIS

| | |
|---|---|
| Sample Mw: | 289819 |
| Standard Casein Mw: | 289819 |
| Estimated % Hydrolysis: | 0.0 |

TABLE II

SEC HPLC CHROMATOGRAPHY OF HYDROLYZED PROTEINACEOUS MILK SOLID OF INVENTION

Method: SEC1
Conditions: TSK G3000SW column, 60 × 0.75 cm, A 280 nm. Mobile phase: 0.1M $KH_2PO_4$ 0.1M $Na_2SO_4$, 5% MeOH, pH 6.8.

MOLECULAR WEIGHT DISTRIBUTION REPORT

| PEAK # | % AREA | PEAK M.W. | NUMBER AVE | WEIGHT AVE | Z AVE | POLYDISPERSITY |
|---|---|---|---|---|---|---|
| 1 | 29.83 | 642240 | 591495 | 605290 | 616698 | 1.023 |
| 2 | 70.17 | 41377 | 357 | 49948 | 138225 | 140.0 |
| Total | 100.00 | | 578 | 262355 | 560447 | 454.2 |

ESTIMATED % HYDROLYSIS

| | |
|---|---|
| Sample Mw: | 262355 |
| Standard Casein Mw: | 289819 |
| Estimated % Hydrolysis: | 9.5 |

TABLE III

SEC HPLC CHROMATOGRAPHY OF HYDROLYZED CASEIN OF U.S. Pat. No. 4,545,933

Method: SEC1
Conditions: TSK G3000SW column, 60 × 0.75 cm, A 280 nm. Flow 0.7 ml/min 0.1M $KH_2PO_4$, 0.1M $Na_2SO_4$, 10% MeOH, pH 6.8.

MOLECULAR WEIGHT DISTRIBUTION REPORT

| PEAK # | % AREA | PEAK M.W. | NUMBER AVE | WEIGHT AVE | Z AVE | POLYDISPERSITY |
|---|---|---|---|---|---|---|
| 1 | 2.58 | 794009 | 812031 | 815787 | 819758 | 1.005 |
| 2 | 16.65 | 691859 | 589887 | 619426 | 640816 | 1.050 |
| 3 | 80.77 | 45604 | 102 | 47053 | 111411 | 459.6 |
| Total | 100.00 | | 126 | 158030 | 536041 | 1256 |

ESTIMATED % HYDROLYSIS

| | |
|---|---|
| Sample Mw: | 158030 |
| Standard Casein Mw: | 190839 |
| Acid Hydrolyzed Casein Mw: | 505 |
| Estimated % Hydrolysis: | 17.2 |

TABLE IV

SEC HPLC CHROMATOGRAPHY OF ACID HYDROLYZED CASEIN STANDARD

Method: SEC1
Conditions: TSK G3000SW column, 60 × 0.75 cm, A 280 nm. Flow 0.7 ml/min 0.1M $KH_2PO_4$, 0.1M $Na_2SO_4$, TABLE IV-continued

| SEC HPLC CHROMATOGRAPHY OF ACID HYDROLYZED CASEIN STANDARD | | | | | | |
|---|---|---|---|---|---|---|
| 10% MeOH, pH 6.8. | | | | | | |
| MOLECULAR WEIGHT DISTRIBUTION REPORT | | | | | | |
| PEAK # | % AREA | PEAK M.W. | NUMBER AVE | WEIGHT AVE | Z AVE | POLYDISPERSITY |
| 1 | 57.67 | 436 | 470 | 642 | 1212 | 1.364 |
| 2 | 42.33 | 148 | 48 | 145 | 168 | 3.026 |
| Total | 100.00 | | 110 | 505 | 2076 | 4.613 |

| ESTIMATED % HYDROLYSIS | |
|---|---|
| Sample Mw: | 505 |
| Standard Casein Mw: | 190839 |
| Acid Hydrolyzed Casein Mw: | 505 |
| Estimated % Hydrolysis: | 99.7 |

FIGS. 2, 3, 4 and 5 show plots of the detector response for the chromatographic samples of Tables 1 through 4 respectively. As is evident from FIGS. 22 through 4, the hydrolyzed proteinaceous milk solid of the invention qualtitatively exhibits significantly different molecular weight distributions compared to the hydrolyzed casein of U.S. Pat. No. 4,545,933, and additionally is shifted to lower molecular weights compared to the casein standard. All of these are significantly different from the acid hydrolyzed standard which is composed exclusively of small molecular weight fractions.

Figure 4:
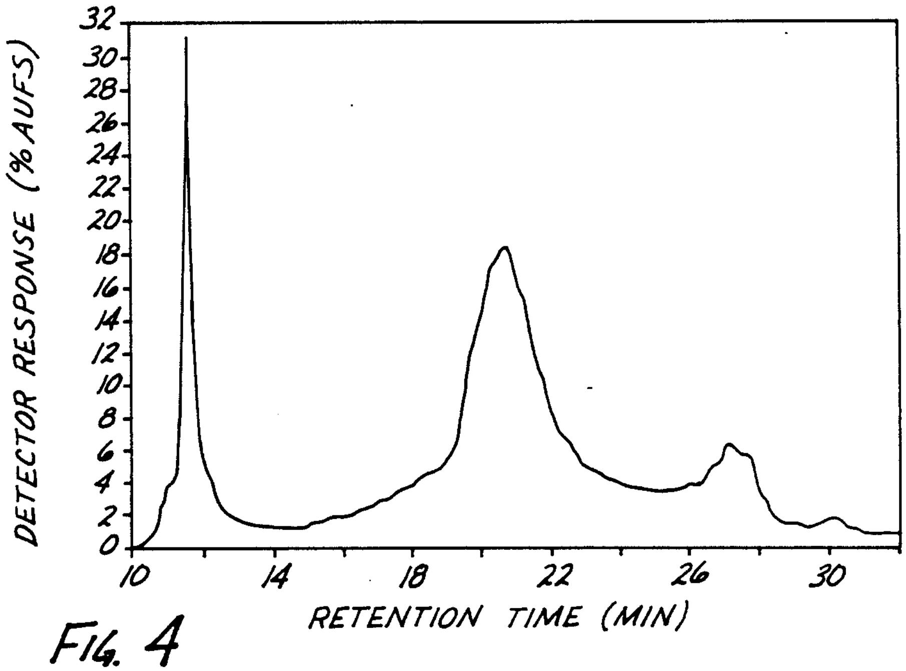
Figure 5:
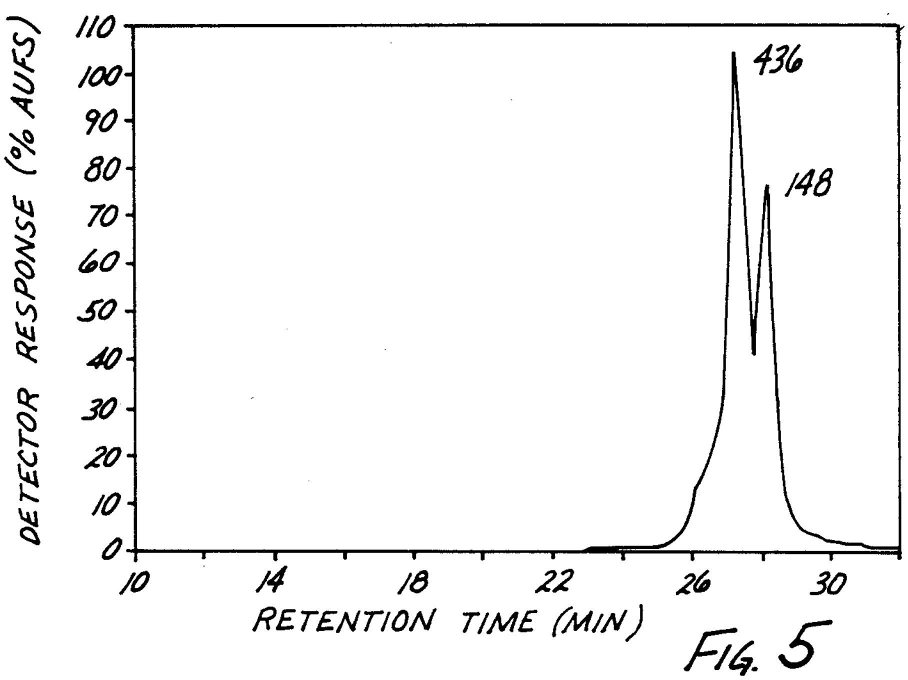

Quantitative comparison of the peaks of the curves of FIGS. 2 through 4 are made by comparisons to a calibration curve obtained from standard reference proteins run with each set of samples. Estimated hydrolysis percentages are obtained from a comparison of the sample values to a standard fine mesh casein sample. The use of the acid hydrolyzed standard ensured analytical detection of hydrolysis.

Utilizing the molecular weight distributions as shown in Tables 1 through 4, an estimated percent of hydrolysis can be obtained wherein the casein standard has essentially zero hydrolysis and the acid hydrolyzed casein has essentially 100% hydrolysis. Between these two limits the hydrolyzed proteinaceous milk solid of the invention has about 9.5% hydrolysis and the hydrolyzed casein of U.S. Pat. No. 4,545,933 about 17.2% hydrolysis.

As is evident from Tables 1 through 4 and FIGS. 2 through 5 the hydrolyzed proteinaceous milk solid of the invention is significantly different from both casein and the hydrolyzed casein of U.S. Pat. No. 4,545,933.

As is further evident from Table 2, the product of the invention has first and second HPLC size exclusion chromatography molecular weight distribution profiles having peak molecular weights at about 642,240 and 41,377, respectively. The percent area of these peaks is 29.83 and 70.17, respectively. This differs from three peak molecular weights (and their respective percent areas) of both the standard casein and the hydrolyzed casein of U.S. Pat. No. 4,545,933.

We claim:

1. A process for preparing hydrolyzed proteinaceous milk solids comprising:

selecting as a starting material a heat treated skim milk liquor containing denatured whey proteins and having skim milk solids including said denatured whey proteins present at a concentration by weight of from about 9 to about 25 percent solids in water;

rapidly heating said skim milk liquor to a temperature of from about 170° F to 200° F;

adding acid to said skim milk liquor to adjust the pH of said skim milk liquor to a pH of from pH 3.9 to pH 5.0;

aging said pH adjusted heated skim milk liquor for a time period of from about 1 minute to about 10 minutes to coagulate and agglomerate whey and casein proteins, carbohydrates and ash in said skim milk liquor into coagula suspended in whey liquid;

separating said coagula from said whey liquid;

cooling said separated coagula;

dewatering said coagula to a coagulum solid;

selecting a caustic agent from the group consisting of sodium hydroxide, potassium hydroxide, ammonium hydroxide and magnesium hydroxide;

solubilizing said caustic agent in water; and stirring said coagulum solid with said solubilized caustic agent for a time period of from about 10 to about 30 minutes.

2. A process of claim 1 including:

cooling said separated coagula with water, said cooling water utilized in an amount by weight no greater than twice the weight of said coagula; and separating said cooled coagula from said cooling water.

3. A process of claim 1 including:

adjusting the skim milk solids concentration of said skim milk liquor to a solids concentration of from about 15 to about 20 percent by weight of said solids in water.

4. A process of claim 1 including:

selecting as said denatured whey protein containing heat treated skim milk liquor at least one of the group consisting of heat treated liquid skim milk, heat treated re-diluted concentrated skim milk, heat treated skim milk solids in water and "high heat" nonfat dry milk solids in water.

5. A process of claim 3 including:

adjusting liquid skim milk with water to a solids content of from about 15 to about 20 percent weight of solids in liquid;

heating said adjusted skim milk at a temperature of about 190° F. for about 20 minutes to about 35 minutes to denature whey proteins in said skim milk; and cooling said skim milk to form said denatured whey protein containing heat treated skim milk liquor.

6. A process of claim 3 including:

rediluting condensed skim milk with water to a solids content of from about 15 to about 20 percent weight of solids in liquid;

heating said rediluted condensed skim milk at a temperature of about 190° F. for about 20 minutes to about 35 minutes to denature whey proteins in said skim milk; and cooling said diluted condensed skim milk to form said denatured whey proteins containing heat treated skim milk liquor.

7. A process of claim 3 including:

mixing dry skim milk solids in water to a solids content of from about 15 to about 20 percent weight of solids in liquid;

heating said skim milk solids in water at a temperature of about 190° F. for about 20 minutes to about 35 minutes to denature whey proteins in skim milk solids; and cooling said skim milk solids in water to form said denatured whey protein containing heat treated skim milk solids liquor.

8. A process of claim 3 including:

selecting "high heat" nonfat skim milk powder; and diluting said "high heat" nonfat skim milk powder with water to a solids contents of from about 15 to about 20 percent weight solids in liquid to form said denatured whey protein containing heat treated skim milk liquor.

9. A process of claim 1 including:

solubilizing said caustic agent in a quantity of water less than 20 percent by weight of the total weight of said caustic agent plus said coagulum solid.

10. A process of claim 1 including:

drying said coagula solid after said dewatering whereby said coagula solid is a dry solid.

11. A process of claim 1 including:

selecting sodium hydroxide as said caustic agent.

12. A process of claim 1 including:

selecting sulfuric acid as said acid used to adjust the pH of said skim milk liquor.

13. A process of claim 1 including:

adding said acid as a dilute acid wherein said acid is diluted with water to a dilution of about 1 part acid in at least 10 parts water.

14. A process of claim 1 including:

adding said acid to said solution to adjust said pH to about pH 4.7.

15. A process of claim 1 including:

dewatering said coagula to a water level whereby said coagula solid contains less than about 55 percent water by weight.

16. A process of claim 1 including:

selecting said skim milk liquor as a liquor containing less than 2 percent fat by weight based on the total dry weight of said skim milk solids.

17. A process for preparing hydrolyzed proteinaceous milk solids comprising:

heating skim milk to a temperature of from about 170° F. to about 200° F. to denature whey proteins in said skim milk;

adding acid to said heated skim milk to adjust the pH of said skim milk to a pH of from pH 3.9 to pH 5.0;

aging said pH adjusted heated skim milk for a time period of from about 1 minute to about 10 minutes to coagulate and agglomerate whey and casein proteins, carbohydrates and ash in said skim milk into coagula suspended in whey liquid;

separating said coagula from said whey liquid;

cooling said separated coagula with an amount of water of a weight no greater than twice the weight of said coagula;

separating said cooled coagula from said cooling water;

dewatering and drying said coagula to a dry coagulum solid;

selecting a caustic agent from the group consisting of sodium hydroxide, potassium hydroxide, ammonium hydroxide and magnesium hydroxide;

solubilizing said caustic agent in water; and stirring said dried coagulum solid with said solubilized caustic agent for a time period of from about 10 to about 30 minutes.

18. In a process for preparing hydrolyzed proteins from casein wherein acid precipitated casein is mixed as a solid with a quantity of a caustic agent, an improvement which comprises:

selecting a heat treated skim milk liquor containing casein and denatured whey proteins and having skim milk solids including said casein and said denatured whey proteins present at a concentration by weight of from about 9 to about 25 percent solids in water;

rapidly heating said skim milk liquor to a temperature of from about 170° F. to 200° F.;

adding acid to said heated skim milk to adjust the pH of said skim milk liquor to a pH of from pH 3.9 to pH 5.0;

aging said pH adjusted heated skim milk for a time period of from about 1 minute to about 10 minutes to precipitate said casein in conjunction with whey proteins, carbohydrates and ash by coagulating and agglomerating said whey proteins, said casein, said carbohydrates and said ash into coagula suspended in whey liquid;

separating said coagula from said whey liquid;

dewatering and drying said coagula to a dry coagulum solid, said dry solid including said casein therein; and treating said dry coagulum solid with said caustic agent.

19. A process of claim 18 further including:

cooling said separated coagula with an amount of water of a weight no greater than twice the weight of said coagula; and separating said cooled coagula from said cooling water prior to said dewatering and drying.

20. A process of claim 19 including:

selecting said caustic agent from the group consisting of sodium hydroxide, potassium hydroxide, ammonium hydroxide and magnesium hydroxide;

solubilizing said caustic agent in water; and stirring said dried coagulum solid with said solubilized caustic agent for a time period of from about 10 to about 30 minutes.

21. A process of claim 18 including:

rapidly heating said skim milk liquor to a temperature of from about 190° F. to about 200° F.

22. A hydrolyzed proteinaceous milk solid comprising:

a protein fraction of from about 60 to about 90 percent by weight, said protein fraction including both hydrolyzed whey and casein protein;

a carbohydrate fraction of from about 1 to about 10 percent by weight;

an ash fraction of from about 1 to about 12 percent by weight;

essentially zero fat; and a pH of from about pH 5.1 to about pH 11.0.

23. A hydrolyzed proteinaceous milk solid of claim 22 including:

said solid having first and second HPLC size exclusion chromatography molecular weight distribution profiles having peak molecular weights at about 642,240 and 41,377, respectively.

24. A hydrolyzed proteinaceous milk solid of claim 22 wherein:

said solid has an estimated percent hydrolysis of said hydrolyzed whey and casein proteins of about 9.5 percent compared to about 0 percent for non-hydrolyzed casein and greater than 99 percent for acid hydrolyzed casein.

25. A hydrolyzed proteinaceous milk solid comprising:

denatured and hydrolyzed whey protein;

hydrolyzed casein protein;

milk carbohydrates; and milk ash.

* * * * *

UNITED STATES PATENT AND TRADEMARK OFFICE
CERTIFICATE OF CORRECTION

PATENT NO. : 4,973,488

DATED : NOVEMBER 27, 1990

INVENTOR(S) : MICHAEL F. ERNSTER

It is certified that error appears in the above-identified patent and that said Letters Patent is hereby corrected as shown below:

Column 2, line 40, "process" should be --processed--.

Column 3, line 39, "ingoranic" should be --inorganic--.

Column 4, line 12, insert --as-- between "to" and "high".

Column 4, line 66, insert --to-- between "contrast" and "the".

Column 7, line 37, "separate" should be --separated--.

Column 8, line 30, "mechanical" should be --mechanically--.

Column 9, line 12, "added" should be --add--.

Column 10, line 14, " heat"-0 " should be -- heat" --.

Column 13, line 20, "Figs. 22" should be --Figs. 2--.

Column 13, line 22, "qualtitatively" should be --qualitatively--.

Signed and Sealed this

Second Day of June, 1992

*Attest:*

DOUGLAS B. COMER

*Attesting Officer*

*Acting Commissioner of Patents and Trademarks*